(12) United States Patent
Gilmore

(10) Patent No.: US 9,651,097 B2
(45) Date of Patent: May 16, 2017

(54) FRICTION CLUTCH ASSEMBLY

(71) Applicant: American Axle & Manufacturing, Inc., Detroit, MI (US)

(72) Inventor: Curt D. Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 113 days.

(21) Appl. No.: 14/666,336

(22) Filed: Mar. 24, 2015

(65) Prior Publication Data

US 2016/0281799 A1   Sep. 29, 2016

(51) Int. Cl.
| F16D 29/00 | (2006.01) |
| F16D 25/08 | (2006.01) |
| F16D 27/115 | (2006.01) |
| F16D 13/69 | (2006.01) |
| F16D 27/00 | (2006.01) |

(52) U.S. Cl.
CPC .......... *F16D 29/00* (2013.01); *F16D 13/69* (2013.01); *F16D 25/082* (2013.01); *F16D 27/115* (2013.01); *F16D 27/00* (2013.01)

(58) Field of Classification Search
CPC ........ F16D 29/00; F16D 25/08; F16D 25/082; F16D 25/083; F16D 2027/005; F16D 27/10; F16D 27/108; F16D 27/112; F16D 27/115; F16D 13/69
See application file for complete search history.

(56) References Cited

U.S. PATENT DOCUMENTS

| 2,272,570 | A | | 2/1942 | Maier | |
| 3,180,469 | A | * | 4/1965 | Wiedmann | F16D 27/08 188/171 |
| 5,115,898 | A | * | 5/1992 | Lehle | F16D 13/52 192/70.11 |
| 6,415,901 | B1 | * | 7/2002 | Usoro | F16D 25/0638 188/72.3 |
| 7,070,034 | B2 | | 7/2006 | Suzuki et al. | |
| 7,086,515 | B2 | | 8/2006 | Kelley, Jr. et al. | |
| 2012/0090943 | A1 | | 4/2012 | Copeland et al. | |

\* cited by examiner

*Primary Examiner* — Richard Lorence
(74) *Attorney, Agent, or Firm* — Harness, Dickey & Pierce, P.L.C.

(57) ABSTRACT

A friction clutch having first and second clutch members, a plurality of first clutch plates, a plurality of second clutch plates and a first electromagnet. The first clutch member is formed of a first magnetically susceptible material. The first clutch plates are axially slidably and non-rotatably coupled to the first clutch member and are formed of a second magnetically susceptible material. The second clutch plates are axially slidably and non-rotatably coupled to the second clutch member. The second clutch plates are interleaved with the first clutch plates. The first electromagnet has a first pole that is magnetically coupled to the first clutch member. The first clutch plates are driven apart from one another when the first electromagnet is operated to generate a magnetic field.

8 Claims, 1 Drawing Sheet

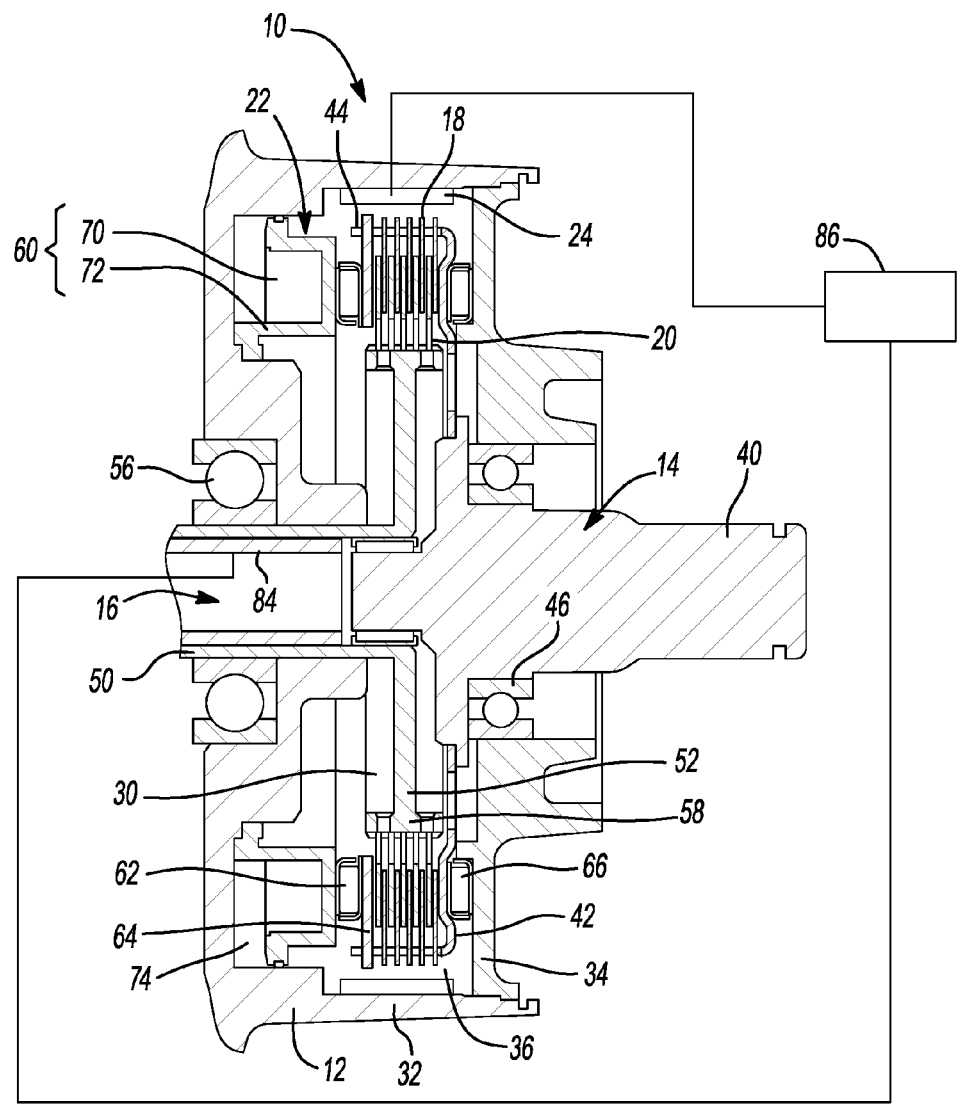

FRICTION CLUTCH ASSEMBLY

FIELD

The present disclosure relates to a friction clutch assembly.

BACKGROUND

This section provides background information related to the present disclosure which is not necessarily prior art.

Friction clutches employ clutch packs having first and second sets of clutch plates that are interleaved with one another. The first and second sets of clutch plates are capable of transmitting torque therebetween when a normal force of sufficient magnitude is applied to them. One drawback associated with friction clutches, particular wet friction clutches in which the first and second sets of clutch plates are disposed in a lubricated environment, is that the first and second sets of clutch plates do not fully disengage one another so that the friction clutch may be capable of transmitting a small amount of torque when no normal force is applied to the first and second sets of clutch plates.

Various arrangements have been suggested for causing the first and second sets of clutch plates to automatically disengage one another. These arrangements include the incorporation of springs into or with the first and second sets of clutch plates or the use of magnets that are mounted on the first and/or second sets of clutch plates. While such arrangements are suited for their intended purpose, there remains a need in the art for an improved friction clutch.

SUMMARY

This section provides a general summary of the disclosure, and is not a comprehensive disclosure of its full scope or all of its features.

In one form, the present teachings provide a friction clutch having first and second clutch members, a plurality of first clutch plates, a plurality of second clutch plates and a first electromagnet. The first clutch member is formed of a first magnetically susceptible material. The first clutch plates are axially slidably and non-rotatably coupled to the first clutch member and are formed of a second magnetically susceptible material. The second clutch plates are axially slidably and non-rotatably coupled to the second clutch member. The second clutch plates are interleaved with the first clutch plates. The first electromagnet has a first pole that is magnetically coupled to the first clutch member. The first clutch plates are driven apart from one another when the first electromagnet is operated to generate a magnetic field.

In another form, the present teachings provide a method for operating a friction clutch. The friction clutch has first and second clutch members, a plurality of first clutch plates and a plurality of second clutch plates. The first clutch member is formed of a first magnetically susceptible material. The first clutch plates are axially slidably and non-rotatably coupled to the first clutch member and are formed of a second magnetically susceptible material. The second clutch plates are axially slidably and non-rotatably coupled to the second clutch member. The second clutch plates are interleaved with the first clutch plates. The method includes: applying a normal force to drive the first and second clutch plates into engagement to permit rotary power of a predetermined magnitude to be transmitted between the first and second clutch members; removing the normal force; and operating a first electromagnet to drive the first clutch plates apart from one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The figure is a sectional, partly schematic view of an exemplary friction clutch constructed in accordance with the teachings of the present disclosure.

Corresponding reference numerals indicate corresponding parts throughout the several views of the drawings.

DETAILED DESCRIPTION

With reference to the figure of the drawings, an exemplary friction clutch constructed in accordance with the teachings of the present disclosure is generally indicated by reference numeral 10. The friction clutch 10 can be of the type that is employed in an automotive driveline component, such as an axle assembly or power take-off unit (PTU) that is capable of being operated in a mode in which rotary power is not intended to be transmitted through the component. The friction clutch 10 can include a housing 12, a first clutch member 14, a second clutch member 16, a plurality of first clutch plates 18, a plurality of second clutch plates 20, a clutch actuator 22 and a first electromagnet 24.

The housing 12 can define a cavity 30 into which the first and second clutch members 14 and 16 and the first and second clutch plates 18 and 20 can be received. In the particular example provided, the housing 12 is an assembly and includes a first housing member 32 and a second housing member 34 that is fitted into a bore 36 formed in the first housing member 32.

The first clutch member 14 can be formed in one or more pieces of a magnetically susceptible material, such as steel, and can include a first shaft portion 40, a first flange 42 and a drum portion 44. The first shaft portion 40 can be supported for rotation relative to the housing 12 via a first bearing 46. The first flange 42 can exend radially outwardly from the first shaft portion 40 and can connect the drum portion 44 to the first shaft portion 40. The drum portion 44 can conventionally define a plurality of spline teeth (not specifically shown) that can extend generally parallel to a rotational axis of the first clutch member 14.

The second clutch member 16 can be formed of a magnetically susceptible material, such as steel, and can include a second shaft portion 50 and a second flange 52. The second shaft portion 50 can be supported for rotation relative to the housing 12 via a second bearing 56. The second flange 52 can extend radially outwardly from the second shaft portion 50 and can terminate at a mount 58 that can have a plurality of spline teeth (not specifically shown) that can extend generally parallel to a rotational axis of the second clutch member 16.

The first clutch plates 18 can have a first annular body (not specifically shown) and first friction material (not specifically shown) that can be disposed on the opposite axial surfaces of the first annular body. The first annular body can be formed of a magnetically susceptible material, such as steel, and can define grooves (not specifically shown) that can engage the spline teeth formed on the drum portion 44 so that the first clutch plates axially slidably but non-rotatably engage the first clutch member 14.

The second clutch plates 20 can have a second annular body (not specifically shown) and a second friction material (not specifically shown) that can be disposed on the opposite axial surfaces of the second annular body. The second annular body can be formed of a magnetically susceptible material, such as steel, and can define grooves (not specifically shown) that can engage the spline teeth formed on the mount 58 of the second flange 52 so that the second clutch plates axially slidably but non-rotatably engage the second clutch member 16. The second clutch plates 20 can be interleaved with the first clutch plates 18.

The clutch actuator 22 can be configured to generate a normal force that drives the first and second clutch plates 18 and 20 together so that rotary power of a predetermined magnitude can be transmitted between the first and second clutch members 14 and 16. In the particular example provided, the clutch actuator 22 comprises a hydraulic cylinder 60, a first thrust bearing 62, an apply plate 64 and a second thrust bearing 66. The hydraulic cylinder 60 can comprise a cylinder 70, which can be formed in the housing 12, and a piston 72. The cylinder 70 can define an anular cavity 74 that can be coupled in fluid connection to a source of fluid power (not shown). The piston 72 can have an annular shape and can be received in the annular cavity 30. The apply plate 64 can be an annular structure that can define grooves (not specifically shown) that can engage the spline teeth formed on the drum portion 44 so that the apply plate 64 axially slidably but non-rotatably engages the first clutch member 14. The first thrust bearing 62 can be disposed between the piston 72 and the apply plate 64. The second thrust bearing 66 can be disposed between the first flange 42 and the housing 12.

The first electromagnet 24 can comprise one or more electromagnets that can be mounted to the housing 12 and can include a pole (e.g., north pole) that can be selectively magnetically coupled to the drum portion 44. In the particular example provided, the first electromagnet 24 comprises a plurality of circumferentially spaced apart electromagnets that are mounted to the first housing member 32 and disposed radially outwardly from the drum portion 44. The polarity of the pole of the first electromagnet 24 is transmitted to the drum portion 44 and the first clutch plates 18. The first electromagnet 24 can be operated to generate a magnetic field so that the drum portion 44, and the first clutch plates 18 that are mounted to the drum portion 44, will take on the polarity of the adjacent pole of the first electromagnet 24. It will be appreciated that each of the first clutch plates 18 will have the same magnetic polarity when the first electromagnet 24 is operated and as such, the first clutch plates 18 will be magnetically repelled from one another so as to reduce drag forces within the friction clutch 10 when the friction clutch 10 is to be disengaged so as not to transmit rotary power between the first and second clutch members 14 and 16. Additionally, the force generated by the repulsion of the first clutch plates 18 from one another can speed the time that is required to disengage the friction clutch 10.

Optionally, the friction clutch 10 can further include a second electromagnet 84 and a controller 86. The second electromagnet 84 can comprise one or more electromagnets that can include a pole that can be magnetically coupled to the second flange 52. In the particular example provided, the second electromagnet 84 is a hollow cylindrical structure that is received into a hollow portion of the second shaft portion 50. The second electromagnet 84 can directly contact the second shaft portion 50 so that the polarity of the adjacent pole of the second electromagnet 84 is transmitted through the second shaft portion 50 to the second flange 52 and ultimately to the second clutch plates 20. The second electromagnet 84 can be operated to generate a magnetic field so that the second flange 52, and the second clutch plates 20 that are mounted to the second flange 52, taken on the polarity of the adjacent pole of the second electromagnet 84. It will be appreciated that each of the second clutch plates 20 will have the same magnetic polarity (due to their direct contact with the second flange 52) when the second electromagnet 84 is operated and as such, the second clutch plates 20 will be magnetically repelled from one another if the second electromagnet 84 is operated when the first electromagnet 24 is not operated. The controller 86 can be employed to selectively operate the first and second electromagnets 24 and 84.

The first and second electromagnets 24 and 84 could be configured such that the polarity of the magnetic fields that are applied to both the first and second clutch plates 18 and 20 is the same so that when the first and second electromagnets are operated, the first clutch plates 18 will be urged away from the second clutch plates 20 and vice versa. Configuration in this manner could be employed to ensure that no drag force is created by the first and second clutch plates 18 and 20. Alternatively, the first and second electromagnets 24 and 84 could be configured such that the polarity of the magnetic field that is applied to the first clutch plates 18 is opposite the polarity of the magnetic field that is applied to the second clutch plates 20. Configuration in this manner would permit one of the first and second electromagnets 24 and 84 to be operated to force the first clutch plates 18 apart from one another or the second clutch plates 20 apart from one another, and would magnetically attract the second clutch plates 20 to the first clutch plates 18 if both the first and second electromagnets 24 and 84 were to be operated simultaneously. It will be appreciated that operation in this latter manner could provide more rapid engagement of the first and second clutch plates 18 and 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A friction clutch comprising:
    a first clutch member, the first clutch member being formed of a first magnetically susceptible material;
    a second clutch member;
    a plurality of first clutch plates axially slidably and non-rotatably coupled to the first clutch member, the first clutch plates being formed of a second magnetically susceptible material;
    a plurality of second clutch plates axially slidably and non-rotatably coupled to the second clutch member, the second clutch plates being interleaved with the first clutch plates; and
    a first electromagnet having a first pole that is magnetically coupled to the first clutch member, wherein the first clutch plates are driven apart from one another when the first electromagnet is operated to generate a magnetic field;

wherein the second clutch member is formed of a third magnetically susceptible material, wherein the second clutch plates are formed of a fourth magnetically susceptible material, and wherein the friction clutch further comprises a second electromagnet having a second pole that is magnetically coupled to the second clutch member, wherein operation of the first and second electromagnets drives the first and second clutch plates into engagement with one another.

2. The friction clutch of claim 1, further comprising an actuator for selectively generating a normal force to engage the first clutch plates with the second clutch plates.

3. The friction clutch of claim 2, wherein the actuator is a hydraulic actuator that includes a piston.

4. The friction clutch of claim 2, further comprising a controller for coordinating operation of the actuator and the first electromagnet.

5. The friction clutch of claim 1, wherein the second electromagnet is received into the second clutch member.

6. The friction clutch of claim 5, wherein the second electromagnet has a hollow cylindrical shape.

7. The friction clutch of claim 1, wherein the first electromagnet comprises a plurality of electromagnets that are spaced circumferentially about the first clutch member.

8. A method for operating a friction clutch, the friction clutch having first and second clutch members, a plurality of first clutch plates and a plurality of second clutch plates, the first clutch member being formed of a first magnetically susceptible material, the first clutch plates being axially slidably and non-rotatably coupled to the first clutch member, the first clutch plates being formed of a second magnetically susceptible material, the second clutch plates axially slidably and non-rotatably coupled to the second clutch member, the second clutch plates being interleaved with the first clutch plates, the method comprising:

applying a normal force to drive the first and second clutch plates into engagement to permit rotary power of a predetermined magnitude to be transmitted between the first and second clutch members;

removing the normal force; and operating a first electromagnet to drive the first clutch plates apart from one another;

wherein the second clutch member is formed of a third magnetically susceptible material, wherein the second clutch plates are formed of a fourth magnetically susceptible material, and wherein the method further comprises operating a second electromagnet while the first electromagnet is operating to drive the first and second clutch plates into engagement with one another.

* * * * *